US005528230A

United States Patent [19]

Kim

[11] Patent Number: 5,528,230

[45] Date of Patent: Jun. 18, 1996

[54] REMOTE CONTROL TRANSMITTER/RECEIVER SYSTEM

[75] Inventor: Ji-Hyun Kim, Kyonggi-do, Rep. of Korea

[73] Assignee: Samsung Electronics Co., Ltd., Kyungki-Do, Rep. of Korea

[21] Appl. No.: 1,737

[22] Filed: Jan. 6, 1993

[30] Foreign Application Priority Data

Jan. 6, 1992 [KR] Rep. of Korea ............................ 92-35

[51] Int. Cl.[6] ............................ G06F 7/04; G08C 19/16; H04L 17/02; H04L 9/10

[52] U.S. Cl. ........................ 340/825.31; 341/176; 380/43

[58] Field of Search ............................ 340/825.31, 825.4; 395/80, 82; 380/43, 24, 23, 21, 17; 341/176; 379/95; 455/31.1, 32.1, 33.1, 38.1, 38.2, 68

[56] References Cited

U.S. PATENT DOCUMENTS

| | | | |
|---|---|---|---|
| 4,112,421 | 9/1978 | Freeny, Jr. | 455/38.1 |
| 4,257,065 | 3/1981 | Papay | 380/17 |
| 4,604,559 | 8/1986 | Hawkes et al. | 395/80 |
| 4,626,847 | 12/1986 | Zato . | |
| 4,837,734 | 6/1989 | Ichikawa et al. | 395/82 |
| 5,091,942 | 2/1992 | Dent | 455/33.1 |
| 5,204,942 | 4/1993 | Otera et al. | 395/80 |
| 5,252,966 | 10/1993 | Lambropoulos et al. | 340/825.31 |

FOREIGN PATENT DOCUMENTS 86501 5/1986 Rep. of Korea .

*Primary Examiner*—Alyssa H. Bowler
*Assistant Examiner*—Mark H. Rinehart
*Attorney, Agent, or Firm*—Sughrue, Mion, Zinn, Macpeak & Seas

[57] ABSTRACT

A remote control transmitter/receiver system in which a transmitter transmits a signal incorporating a secret code and a command function. The receiver receives the signal from the transmitter, discriminates the secret code and command function and performs a user's command only if the secret code in the received signal coincides with a secret code set in the receiver. This remote control transmitter/receiver system includes a transmitter for converting a secret code and function signal into an encoded pulse signal and modulating the pulse signal to transmit the modulated signal. The remote control receiver receives the signal transmitted from the transmitter and demodulates the signal to output a function signal only when the secret code in the demodulated signal coincides with a secret code stored therein to thereby perform the user's command.

13 Claims, 5 Drawing Sheets

REMOTE CONTROL TRANSMITTER/RECEIVER SYSTEM

FIELD OF THE INVENTION

The present invention relates to a remote control transmitter/receiver system for transferring an operator's commands by radio waves to a distance robot system. More particularly, the invention relates to a remote control transmitter/receiver system in which a transmitter transmits radio waves including a secret code and a function signal, while a receiver distinguishes the radio wave function signal from other received radio signals and performs functions relative to the operator's commands if the received secret code coincides with a secrete code previously set therein.

BACKGROUND OF THE INVENTION

A conventional remote control transmitter system is disclosed, in U.S. Pat. No. 4,626,847 proposed by Thomas J. Zato. This remote control transmitter system controls a plurality of functions in a number of different devices and comprises a matrix keyboard having first switches for selecting a memory page in an IC. Second switches select a function code on the page by the X-Y key closure. A device switch has a first plurality of keys and three kinds of setting switches.

Another type of remote control system is disclosed in Korean Patent Publication No. 86-501 proposed by Hunagoshi et al. This remote control system includes a remote control manipulator unit for transmitting control signals. These control signals relate to the operation of a command switch and allow easy determination of whether the remote control signals have been received at a receiver. A main unit receives the control signal from the remote control manipulator unit and is controlled by its operations. Detecting means is arranged in the main unit to detect the operationally controlled state as the main unit receives the control signal. This remote control system also includes means for detecting the end of the received control signal, transmitting means, which operates in response to output signals of the detecting means, for transmitting a confirmation signal and means, arranged in the remote control manipulator unit, for receiving a confirmation signal to indicate a confirmed state.

However, the above remote control systems have retained various problems such as complicated structures, high manufacturing costs (due to an increased number of manufacturing elements) and inaccuracy in determining the contents of the secret code and function signal.

SUMMARY OF THE INVENTION

The present invention has been made in consideration of the above problems.

An object of the invention is to provide a remote control transmitter/receiver system, the construction of which is very simple and the manufacturing costs of which are small. The invention allows the contents of a secret code and a function signal to be entered via a transmitter, while a receiver precisely identifies the contents of the secret code and the function signal from the transmitted signal.

To achieve the above objects, a remote control transmitter/receiver system according to a preferred embodiment of the present invention includes a transmitter and a receiver. The transmitter comprises a first secret code input for inputting a secret code and a functional key input for inputting command functions of an operator or a manufacturer. A basic frequency pulse generator generates a basic frequency pulse and an encoder encodes the secret code and the function signal into a group of pulses together with pulses generated from the pulse generator when the secret code and the function signal are input from the basic frequency pulse generator and functional key input. A signal modulator modulates the encoded signal from the encoder and transmits the modulated signal.

The receiver comprises a second secret code input for inputting a secret code, a clock generator for generating clock signal of a predetermined frequency and a signal demodulator for receiving the signal transmitted from the signal modulator in the transmitter and for demodulating the signal. An inverter inverts the pulse group including the secret code and the function signal demodulated by signal demodulator. A microcomputer outputs a function signal to drive a robot system, only if the secret code included within the pulse group input from the signal demodulator coincides with the secret code previously stored in the second secret code input means.

DESCRIPTION OF THE PREFERRED EMBODIMENT

A preferred embodiment of the present invention will now be described in detail with reference to the drawings.

Figure 1:
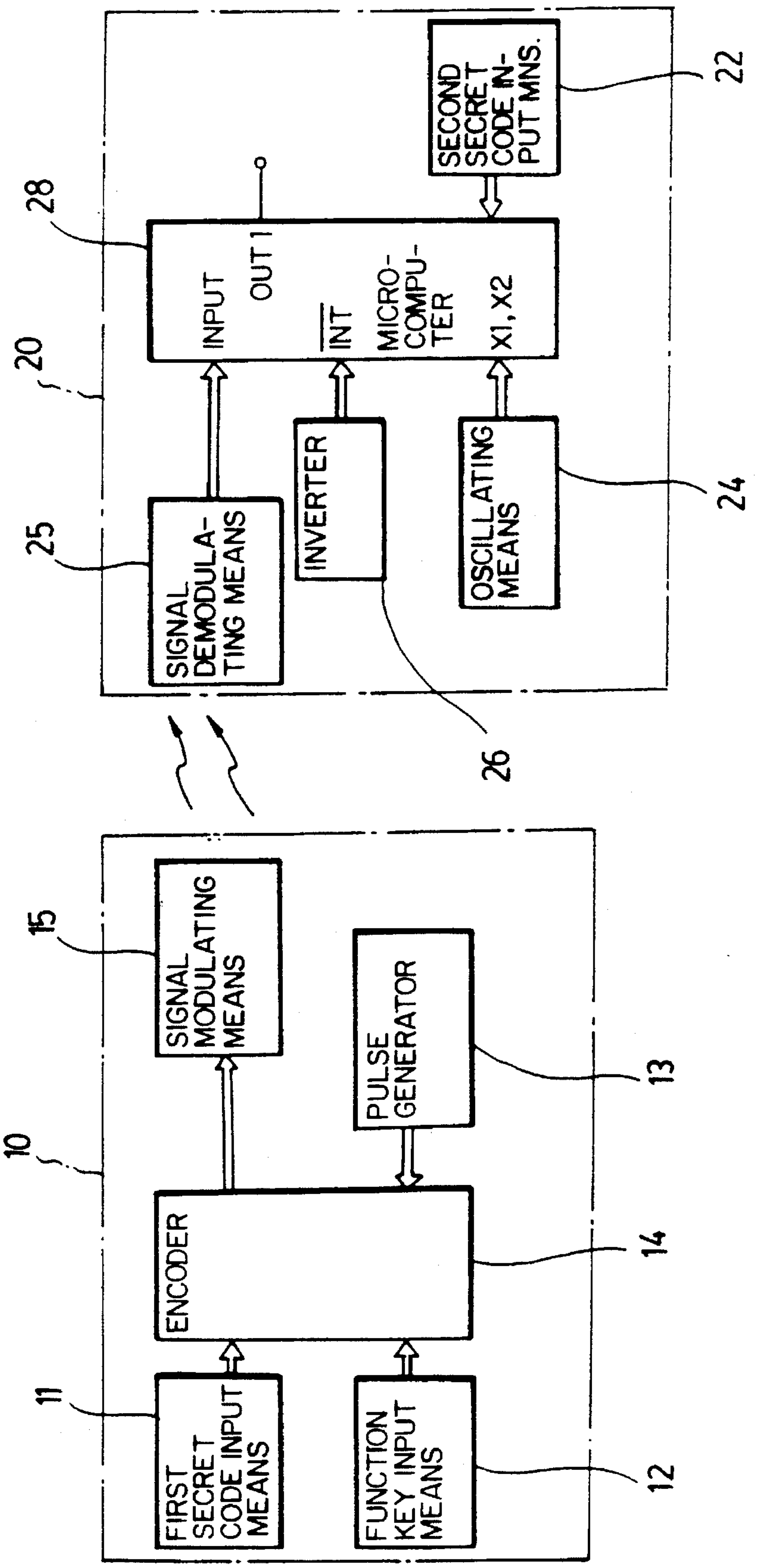
FIG. 1 is a schematic block diagram of a remote control transmitter/receiver system in an embodiment of the present invention.

FIG. 1 shows a schematic block diagram of a remote control transmitter/receiver system according to the preferred embodiment of the present invention. As shown in FIG. 1, the remote control transmitter/receiver system comprises a remote control transmitter 10 for converting a secret code and a function signal into an encoded pulse signal and modulating the pulse signal to transmit the modulated signal. A remote control receiver 20 receives the signal transmitted from the transmitter and demodulating the signal to output a function signal, only when the secret code in the demodulated signal coincides with a secret code previously stored therein, thereby performing the user's command.

More particularly, the transmitter 10 includes a first secret code input means 11 for inputting the secret code and function key input means 12 for inputting user command functions. A pulse generator 13 generates a basic frequency pulse signal. An encoder 14 encodes the pulse signal into a group of pulse signals having a predetermined pattern, based on the output pulse of the pulse generator 13 at the instant when the secret code and the function signal are entered from the first secret code input means 11 and function key input means 12. Signal modulating means 15 modulates the pulse signal encoded by the encoder 14 into a high frequency carrier wave signal and outputs the modulated signal.

The receiver 20 includes a second secret code input means 22 for inputting the same secret code as that input by the first secret code input means 11 of the transmitter 10. Oscillating means 24 produces an oscillating clock pulse of a predetermined frequency. Signal demodulating means 25 receives, via an antenna, the signal transmitted from the signal modulating means 15 in the transmitter 10. The demodulating means removes an undesired high frequency carrier wave and demodulates the carrier-removed signal into a group of pulse signals similar to the pulse group output from the encoder 14. An inverter 26 inverts the group of modulated pulse signals including the secret code and the function signal outputted from the signal demodulating means 25.

A microcomputer 28 receives, via an input terminal INPUT, the pulse input from the signal demodulating means 25, and via an interrupt input terminal INT, the inverted pulse from inverter 26. The microcomputer 28 identifies the values in the pulse signal from the inverter 26 by counting a predetermined time $t_c$ after a falling edge of each inverted pulse. Thereafter, the microcomputer 28 outputs a function signal, via an output terminal OUT1, only if the first secret code in the pulse signal coincides with the second secret code stored in the input means 22. This function signal drives a robot system.

Figure 2:
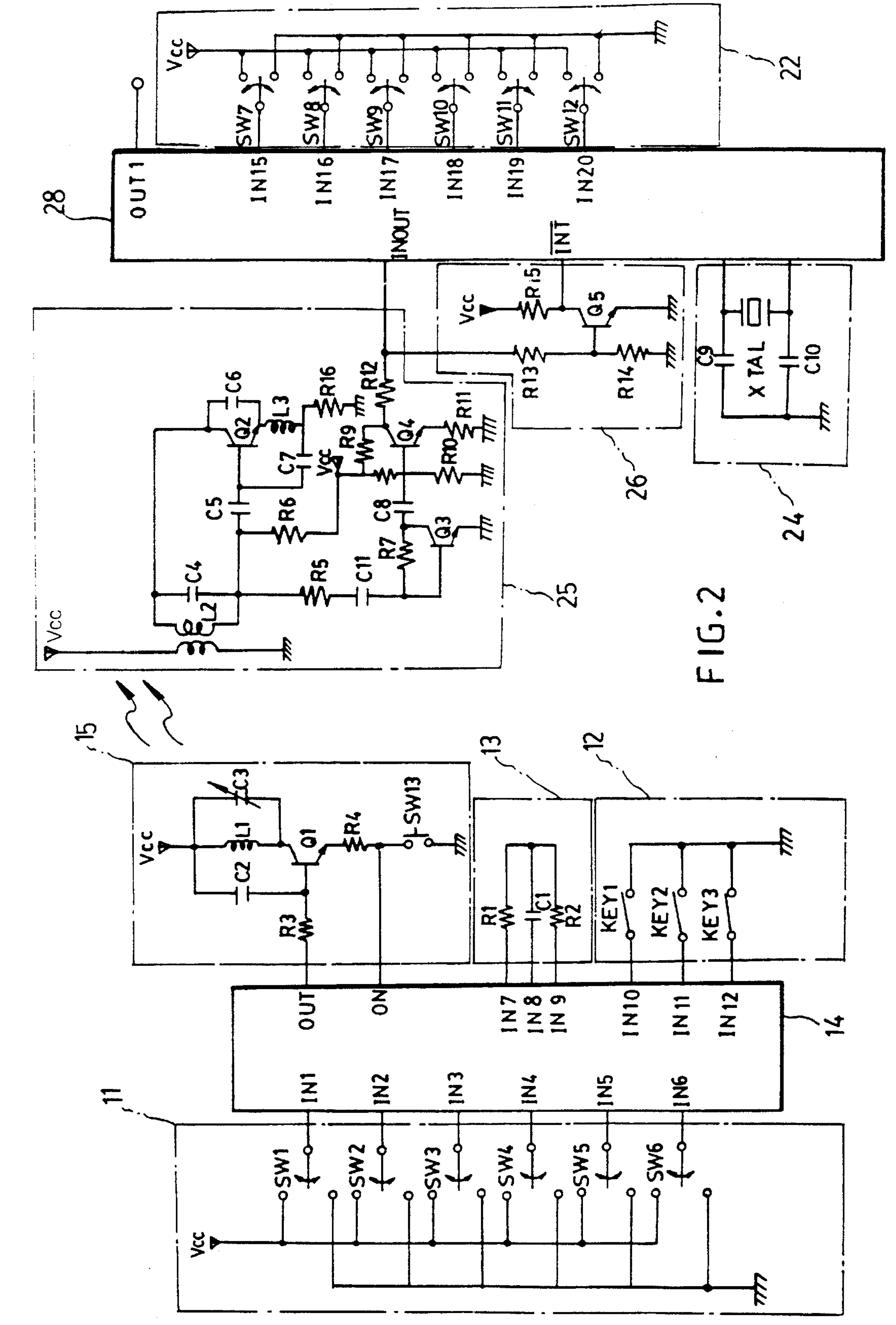
FIG. 2 is a detailed circuit diagram of a remote control transmitter/receiver system in an embodiment of the present invention.
Figure 3:
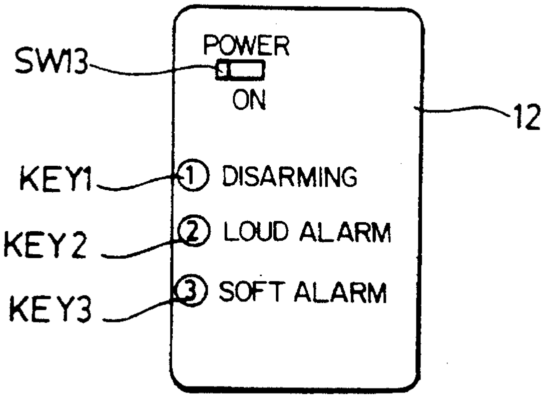
FIG. 3 is a plan view showing an external appearance of a remote control transmitter of the present invention.

FIG. 2 is a detailed circuit diagram of the remote control transmitter/receiver system in the preferred embodiment of the present invention. FIG. 3 is a plan view showing an exterior appearance of the remote control transmitter system according to the present invention.

As shown in detail in FIG. 2, the first secret code input means 11 includes a plurality of select switches SW1 to SW6 which are connected at a first end to input terminals IN1 to IN6 of the encoder. The select switches SW1 to SW6 are selectively connected at a second end to one of Vcc and GND. These switches are used to enter the secret code and allow up to $2^6=64$ secret codes to be allocated. After the remote control transmitter/receiver system has been manufactured, the secret code in the second secret code input means (22) in the receiver is set. The secret code in the second secret code input means 22 is set by the manufacturer in accordance with the secret code to be entered in the first secret code input means 11 in the transmitter 10. The receiver outputs the function signal, to drive a robot system, only if the secret code of the transmitter 10 coincides with the secret code previously set in the receiver.

Alternatively, when noise or erroneous operations occur during use, an operator can change the secret code by manipulating the first and second secret code input means 11 and 22. In this case, the new secret codes must be set to coincide in the first and second secret code input means 11 and 22 in the transmitter 10 and the receiver 20, respectively, of the remote control transmitter/receiver system.

The function key input means 12 comprises first, second and third function push switches KEY1 to KEY3 which are connected at one end to the input terminals of the encoder 14 and at an opposite end to GND. In this structure, as shown in FIG. 3, the first function push-switch KEY1 controls a disarming function. If the first switch KEY1 is pressed once, a security sensing operation of the robot system is stopped. If the first switch KEY1 is pressed twice, the security sensing operation of the robot system is started. The second function push-switch KEY2 controls a loud alarm signaling function and generates a signal for auto-dialing a central monitor unit (not shown) at a remote destination, via auto-dialer means (not shown). The auto-dialer means informs the central monitor of an abnormal state. The third function push-switch KEY3 acts to produce a beep signal which indicates the position of the robot system.

The pulse generator 13 contains a parallel circuit which includes two resistors R1 and R2 and a capacitor C1, each having one end connected to input terminals IN7 to IN9 of the encoder 14, to generate pulses of a basic frequency. The encoder 14 receives input signals, such as the secret code and the function signal, from the first secret code input means 11 and the function key input means 12. The encoder 14 encodes these input signals according to the frequency of the pulses from the basic frequency pulse generator 13. The input signals are encoded into a group of pulses having a predetermined pattern which will be described later. The signal modulating means 15 receives the encoded group of pulses supplied through a resistor R3 from an output terminal OUT of the encoder 14. The modulating means 15 amplifies the encoded pulses by using the transistor Q1 acting as an output amplifier and then modulates the amplified signal together with a d.c. voltage.

The d.c. voltage is produced by a voltage source Vcc, via a parallel circuit, including an inductor L1 and a variable capacitor C3. The amplified signal and the d.c. voltage are modulated into a high frequency carrier wave such that when a slidable power switch SW13 is turned ON, the encoded pulse group is transmitted. In this structure, a resistor R4 is disposed between the slidable power switch SW13 and an emitter of the transistor Q1 in order to stabilize operation of the transistor Q1, while a capacitor C2 is connected between a base of the transistor Q1 and Vcc to intercept d.c. components.

FIG. 5*a* and 5*b* illustrate waveforms output from the transmitter and received by the receiver and time sensing thereof by the remote control receiver. As shown in FIG. 5*a*, in the remote control receiver 20, signal demodulating means 25 receives the signal modulated by the transmitter into the high frequency carrier wave signal including the secret code and function signal. This transmitted signal is received through an antenna and a synchronous receiving circuit in which an inductor L2 and a capacitor C4 are connected in parallel. The received signal is supplied through a resistor R5, a capacitor C11 (for interrupting d.c. voltage components in the received signal) and a resistor R7 as a bias resistor to a transistor Q3. The received signals is amplified by the transistor Q3.

Next, the amplified signal is filtered by a capacitor C8 and then supplied through bias resistors R6, R8, R9 and R10 to a transistor Q4 to be again amplified. Thus, the transistor Q4 outputs a demodulated signal as a group of pulses including the secret code and the function signal in the same manner as that encoded by the encoder 14 in the transmitter 10. In the demodulating means 25, the carrier wave received through the inductor L2 is filtered into d.c. components by a filter circuit including capacitors C4, C5 and C7 connected in series and parallel. The high frequency components in the carrier wave are by-passed to GND through the capacitor L3 and the resistor R16 by turning ON the transistor Q2. This by-passing effect occurs since the inductor L2 is connected at one end to a base of the transistor Q2 through the capacitor C5 and is connected at another end to a collector of the transistor Q2.

The inverter 26 inverts the pulse group, which is diverged at an output resistor R12 in the signal demodulating means 25, into a signal as shown in FIG. 5*b*. The pulse group includes the secret code and the function signal modulated by signal demodulating means 25. The inverter 26 is composed of bias resistors R13 and R14, a transistor Q5 and a resistor R15 which is connected between the transistor Q5 and Vcc. Oscillating means is connected to the input terminals X1 to X2 of the microcomputer 28 so as to supply clock signals. The oscillating means comprises a crystal oscillator XTAL and capacitors C9 and C10. These capacitors C9 and C10 are connected at one end to GND and are provided with a X-tal oscillator XTAL therebetween. The clock signals oscillate at a predetermined frequency and are supplied to the microcomputer 28.

Further, the receiver 20 is provided with a second secret code input means 22 similar to the first secret code input means in the transmitter 10. The second secret code input means 22 includes a plurality of select switches SW7 to SW12, which are connected at one side to input terminals IN15 to IN20 of the microcomputer 28 and are selectively connected at another side to one of two terminals. The two terminals are respectively connected to Vcc and GND, thereby allowing $2^6$=64 secret codes to be allocated. The secret codes are set prior to operation in accordance with the code of the transmitter 10 by the manufacturer after making the present remote control transmitter/receiver system.

Alternatively, the secret codes may be changed as needed by the user upon the generation of noise or an erroneous operation.

The microcomputer 28 receives the pulse group demodulated by the signal demodulating means 25 as shown in FIG. 5*a* and the inverted pulse shown in FIG. 5*b* and then outputs a function signal together with a clock signal oscillating at a predetermined frequency determined by the oscillating means. The function signal is output, via terminal OUT1 of the microcomputer 28, when the secret code in the received pulse group coincides with the secret code inputted by the second secret code input means 22.

The operation of a remote control system according to the present invention constructed as described above, when the secret code is set at "101101", will be described hereafter with reference to FIGS. 2 to 6.

Figure 6:
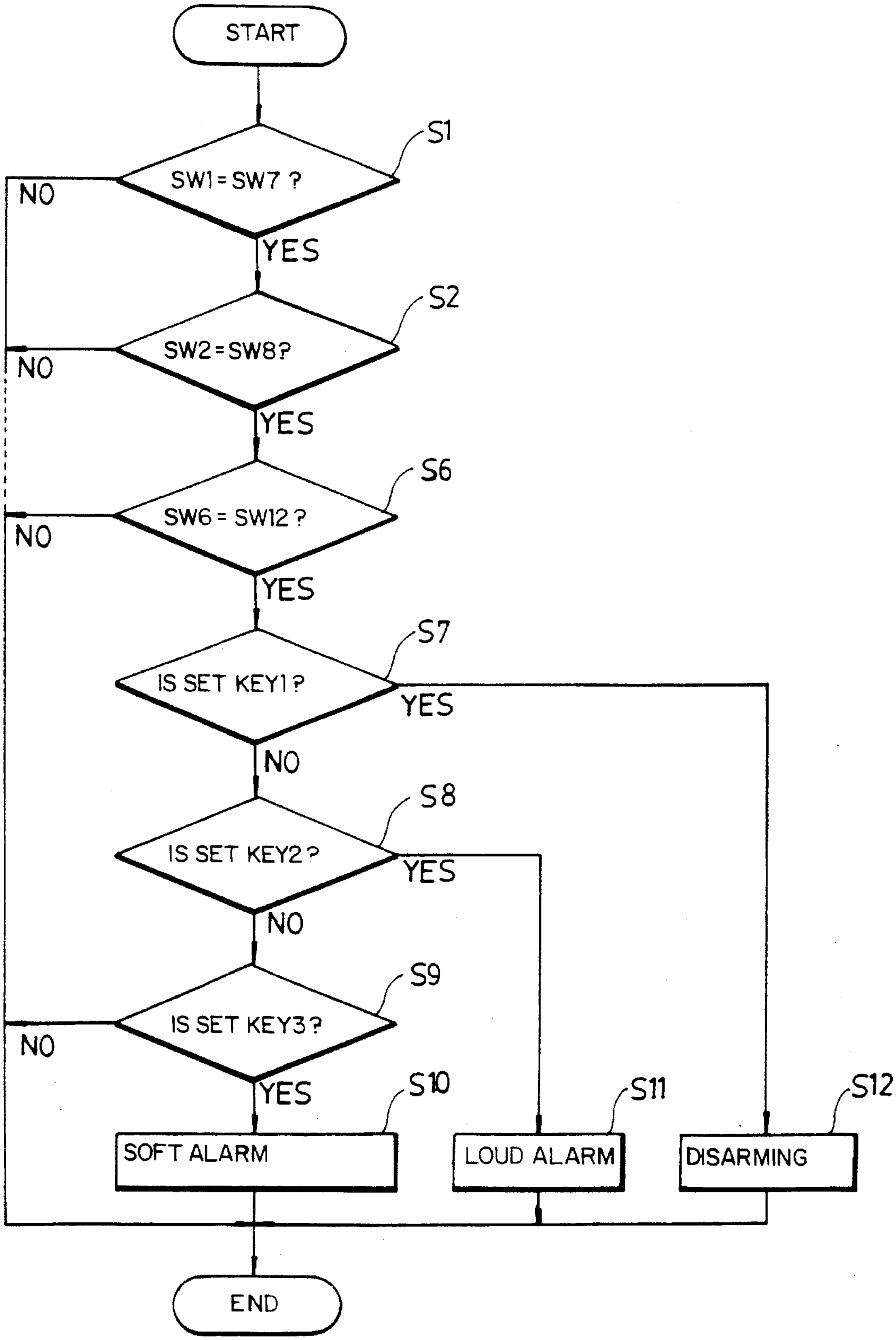
FIG. 6 is a flowchart illustrating a method for selecting functions relative to the input of secret code and function keys.

FIG. 4*a* through 4*e* show output waveforms of the encoder 14 when the power switch and function keys in the transmitter of FIG. 3 are operated. FIG. 6 is a flowchart illustrating a method for selecting functions related to the inputs of the secret code and function keys.

Once the power switch SW13 of transmitter 10 is turned ON, a power supply voltage having a waveform shown in FIG. 4*a* is supplied to each of the circuit means. At this instant, the first to third function push-switches KEY1 to KEY3 have not yet been operated. Since the secret code has been set to "101101" by the first secret code input means 11, the waveform having a period shown in FIG. 4*d* is supplied to the secret code input terminals IN1 to IN6 of the encoder 14. Thereafter, when the first function push-switch KEY1 of the function key input means 12 is pressed during effective time Tc (FIG. 4*b*), the encoder 14 outputs a waveform (FIG. 4*e*) through the output terminals OUT. More specifically, the encoder 14 outputs a pulse waveform "1011010" which includes the secret code "101101" and the function signal "0" as shown in FIG. 4*e*. This waveform is modulated by signal modulating means 15 and the modulated signal is transmitted.

Accordingly, the receiver 20 of the robot system receives the waveform transmitted from the transmitter 10 and reproduces the waveform into a group of pulses similar to the signal output from the output terminal of the encoder 14 (shown in FIG. 4*e*). In FIGS. 4*d* and 4*e*, the reference mark "open" means that corresponding ones of the first to third function push-switches KEY1 to KEY3 are not pressed and that a function signal is not being input.

The pulse group including the secret code and the function signal which were formed as described above, is input to the input terminal INPUT of the microcomputer 28 (shown in FIG. 2). Also, the pulse group is inverted by the inverter 26 (shown in FIG. 5*b*) and is input to the interrupt terminal INT of the microcomputer 28. Each pulse detected at the interrupt terminal INT of the microcomputer 28 trigger a count. Specifically, the microcomputer 28 counts a predetermined time (shown in FIG. 5*b*) after detecting the falling edge of each pulse in the waveform. After the time to, the computer determines the value of the INPUT line (i.e., a high or a low level). In this manner, the receiver discriminates the code "101101" based on the signal input through the input terminal INPUT. Then, the microcomputer 28 compares the discriminated secret code with the secret code previously set by the second secret code input means 22.

Figure 4:
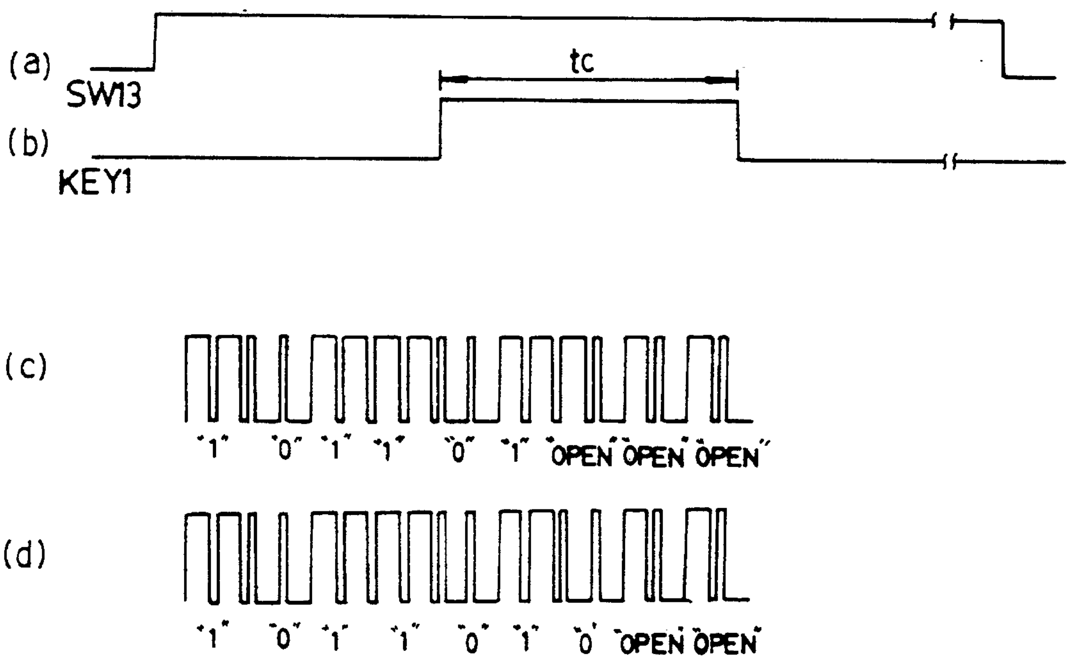
FIG. 4 illustrates output waveforms in operating of a power switch and function keys of a remote control transmitter.
Figure 5:
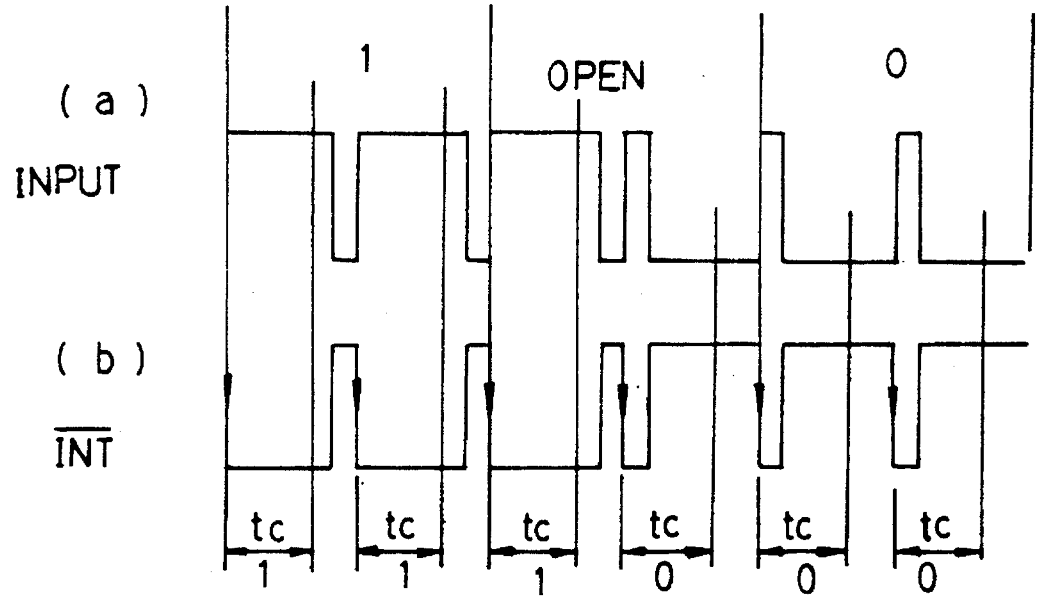
FIG. 5 illustrates input waveforms, and time sensing therefor, of a remote control receiver according to the output waveforms of a remote control transmitter.

As illustrated in FIGS. 4 and 5, the present system uses two input pulses to encode each value of input information (a "1" value, a "0" value or an "open" value). FIGS. 5*a* and 5*b* illustrate the pulse combinations used to identify each value of input information. For instance, an input information value equalling "1" is associated with high levels (hereafter, the "H" level) being detected at the input terminal INPUT after a predetermined period of time $t_c$ has elapsed. This predetermined period of time $t_c$ is measured from the falling edge of the interrupt signal (shown in FIG. 5*b*).

The microcomputer 20 identifies an information value equalling "1" when two consecutive input pulses are identified having a H level. Similarly, the microcomputer 20 identifies an information value equalling "open" when two consecutive input pulses are received, one of which has a L level and one of which has a H level. Similarly, the microcomputer 20 identifies an information value equalling "0" when two input pulses are received, both of which have L levels.

Next, the microcomputer 20 determine whether the secret codes previously set in the transmitter 10 and the receiver 20 coincide with each other. If the secret codes coincide, the microcomputer 28 next determines whether at least one of the first to third function push-switches KEY1 to KEY3 have been pressed.

For example, if the secret code is "101101" and the first function push-switch. KEY1 is pressed, the pulse group shown in FIG. 4*e* is transmitted between the transmitter and the receiver. At this time, once a complete series of input pulses has been received and the input value after the falling edge of each pulse has been measured, the microcomputer 28 compares the pulse group inputted on its input terminal INPUT with the secret code previously set by the secret code selecting switches SW7 to SW12 in the second code input means 22. If the secret codes coincide, the microcomputer 28 outputs a functional command signal through the output terminal OUT1.

Thus, if the first function push-key KEY1 is pressed once, the microcomputer 28 stops the security sensing operation of robot system. If KEY1 is pressed twice, the microcomputer 28 performs the security sensing operation of the robot system. If the second function push-switch KEY2 is pressed, the robot system produces a loud alarm signal and generates a signal to auto-dial the central monitoring device at a remote destination to confirm the generation of an abnormal state by means of an auto-dialer (not shown). If the third function push-switch KEY3 is pressed a beeping sound is generated to indicate the position of the robot system.

When the modulated signal including the secret code and the function signal are input to the input terminal INPUT of the microcomputer 28, the microcomputer 28 performs the functions illustrated in FIG. 6. More particularly, at step S1, the microcomputer 28 determines whether the secret code previously set by the select switch SW1 of the first secret code input means 11 in the transmitter 10 coincides with the secret code previously set by the select switch SW7 of the second secret code input means 22 in the receiver 20. If the answer is YES, the microcomputer 28 executes step S2 and determines whether the secret code previously set by the select switch SW2 of the first secret code input means 11 coincides with the secret code previously set by the select switch SW8 of the second code input means 22. If this result is YES, the procedure is advanced to step S3. Similarly, at steps S3 to S5, the microcomputer 28 determines whether or not the secret codes previously set by the select switches SW3 to SW5 of the first secret code input means 11 coincide with the secret codes previously set by the select switches SW9 to SW11.

If the results at steps S1–S5 are all YES, the procedure is advanced to step S6, at which the microcomputer 28 determines whether the secret code set by the select switch SW6 of the first secret code input means coincide with the secret code set by the select switch SW12 of the second secret code. If the secret codes coincide, the procedure is advanced to a step S7. At step S7 the microcomputer 28 determines whether the first function push-switch KEY1 is set. If the switch KEY1 is set, the procedure is advanced to a S12. At step 12 the microcomputer performs a disarming function so that if KEY1 is pressed once, the security sense operation of the robot system is stopped, whereas if KEY1 is pressed twice, the security sense operation of the robot system is performed.

Meanwhile, if the switch KEY1 is not set, the procedure is advanced to step S8. The microcomputer, at this step S8, determines whether the second function push-switch KEY2 is set. If the determined result is YES, the procedure is advanced to step S11. At step S11 the microcomputer 28 performs functions such as generating an alarm signal, i.e., LOUD ALARM and transferring a control signal to an auto-dialer to make an auto-phone call.

Alternatively, if the result is NO at step S7, the procedure is advanced to a step S9. At step S9 the microcomputer 28 determines whether the third function push-switch KEY3 is set. As a result, if YES, the result is the procedure is advanced to step S10. At step S10 the microcomputer 28 generates a soft alarm SOFT ALARM, that is, an alarm signal that indicates a position of the robot system and then performs subsequent operations.

Meanwhile, if the results are NO at any one of steps S1–S6 or step S9, the microcomputer 28 repeats the above-mentioned sequences of operations.

With the present remote control transmitter/receiver system as described above, it is possible to transmit and receive together the secret code and function signal and to allocate the secret code and function signal and to allocate $2^6=64$ secret codes. In addition, since a receiving unit which determines the secret code and outputs the determined result to the microcomputer is unnecessary, the structure thereof is simplified and the manufacturing cost reduced while allowing a precise determination of the contents of the secret code and the function signal.

While the preferred embodiment of the invention has been described with reference to the accompanying drawings, it is to be understood that the invention is not limited to this precise embodiment and that various changes and modifications thereof could be effected by one skilled in the art without departing from the spirit or scope of the invention as defined in the appended claims.

What is claimed:

1. A remote control transmitter system comprising:

first secret code input means for freely inputting secret codes;

function key input means for inputting command functions;

an encoder for encoding a secret code and a command function into a signal having a group of pulses with a predetermined pattern based on the secret code and the command function entered from the first secret code input means and function key input means, respectively; and signal modulating means for modulating the group of pulses encoded by the encoder into a high frequency carrier wave signal and transmitting the modulated group of pulses, for use in a robot system, wherein said function key input means includes:

a first function push-switch which controls a disarming function of said robot system such that when said first function push-switch is pressed once, a security sensing operation of the robot system is stopped, and when said first function push-switch is pressed twice, the security sensing operation of the robot system is started, a second function push-switch which commands the robot system to generate a loud alarm signal and to generate a signal for auto-dialing a central monitor unit, and a third function push-switch which commands said robot system to produce a beeping signal to indicate a position of the robot system.

2. A remote control transmitter system according to claim 1, wherein said first secret code input means includes a plurality of user-operable selection switches having one end connected to input terminals of the encoder and a second end selectively connected to one of first and second terminals, said first terminal being connected to a voltage source and said second terminal being connected to ground, said plurality of selection switches permitting input of the secret code.

3. A remote control transmitter system according to claim 1, wherein said function key input means includes first, second and third function push-switches, each of which is connected at one end to a corresponding input terminal of the encoder and is connected at another end to ground.

4. A remote control transmitter system according to claim 1, further comprising:

a pulse generator for generating a basic frequency pulse, wherein said pulse generator includes resistors connected in parallel with a capacitor.

5. A remote control transmitter system according to claim 1, wherein said signal modulating means further comprises:

a slidable power switch for turning said transmitter system ON and OFF, a bias resistor for receiving the encoded group of pulses when said slidable power switch is turned ON, a transistor, acting as an output amplifier, for amplifying pulses input to said signal modulating means, and means for modulating the amplified signal together with a d.c. voltage into a high frequency carrier wave, said d.c. voltage being supplied from a d.c. voltage source through a parallel circuit including an inductor and a variable capacitor.

6. A remote control transmitter system according to claim 4, wherein said predetermined pattern used by said encoder to produce said group of pulses is based on said basic frequency pulse generated by said pulse generator.

7. A remote control transmitter/receiver system for use with a robot system, comprising a remote control transmitter for converting a secret code and a function signal into an encoded pulse signal and modulating an encoded pulse signal to transmit a modulated encoded pulse signal and a remote control receiver for receiving and demodulating the modulated encoded pulse signal to output a function signal only when the secret code in the demodulated pulse signal coincides with a stored secret code in the remote control receiver, said transmitter comprising:

first secret code input means for freely inputting secret codes;

function key input means for inputting command functions;

a pulse generator for generating a basic frequency pulse;

an encoder for encoding a secret code and a command function into a pulse signal group having a predetermined pattern based on a pulse signal of the pulse generator when the secret code and the command function are entered from the first secret code input means and function key input means; and signal modulating means for modulating the pulse signal group encoded by the encoder into a high frequency carrier wave signal and for transmitting the modulated pulse signal group; and, said remote control receiver system comprising:

second secret code input means for freely inputting secret codes;

oscillating means for generating an oscillating clock pulse having a predetermined frequency;

signal demodulating means for receiving and demodulating the transmitted modulated pulse signal group into a demodulated pulse signal group;

an inverter for inverting the demodulated pulse signal group including the secret code and the command function outputted from the signal demodulating means to produce an inverted signal group; and, a microcomputer responsive to said inverted signal group outputting function signals for moving the robot system only if the secret code in the demodulated pulse signal group from the signal demodulating means coincides with a secret code set by the second secret code input means, wherein said function key input means comprises:

a first function push-switch which controls disarming function of the robot system, when said first function push-switch is pressed once a security sensing operation of the robot system is stopped, and when said first function push-switch is pressed twice, the security sensing operation of the robot system is started, a second function push-switch which commands to robot system to generate a loud alarm signal and to generate a signal for auto-dialing a central monitor unit, and a third function push-switch which produces a beep signal to indicate a position of the robot system.

8. A remote control transmitter/receiver system according to claim 7, wherein said first secret code input means includes a plurality of user-operable selection switches, first ends of which are connected to input terminals of the encoder and second ends of which are selectively connected to one of a voltage source and a ground, said selection input switches inputting the secret code.

9. A remote control transmitter/receiver system according to claim 7, wherein said function key input means includes first, second and third function push-switches, each of which is connected at one end to input terminals of the encoder and at an opposite end to ground.

10. A remote control transmitter/receiver system according to claim 7, wherein said signal modulating means further comprises:

a slidable power switch, a bias resistor for receiving the encoded group of pulses when said slidable power switch is turned ON, a transistor, acting as an output amplifier, for amplifying pulses input to said signal modulating means, and means for modulating the amplified signal together with a d.c. voltage into a high frequency carrier wave, said d.c. voltage being supplied from a voltage source through a parallel circuit including an inductor and a variable capacitor.

11. A remote control transmitter/receiver system according to claim 7, further comprising a synchronous receiving circuit including an inductor and a capacitor connected in parallel.

12. A remote control transmitter/receiver system according to claim 7, wherein said inverter includes a transistor and bias resistors connected to a base of the transistor.

13. A remote control transmitter system for use in a robot system, comprising:

first secret code input means for inputting secret codes;

function key input means for inputting command functions;

an encoder for encoding a secret code and a command function into a signal having a group of pulses with a predetermined pattern based on the secret code and the command function entered from the first secret code input means and function key input means; and signal modulating means for modulating the group of pulses encoded by the encoder into a high frequency carrier wave signal and transmitting the modulated group of pulses, wherein said function key input means includes first, second and third function push-switches, each of which is connected at one end to a corresponding input terminal of the encoder and is connected at another end to ground, and wherein said function key input means further includes:

a first function push-switch which controls a disarming function of said robot system such that when said first function push-switch is pressed once, a security sensing operation of the robot system is stopped, when said first function push-switch is pressed twice, the security sensing operation of the robot system is started, a second function push-switch which commands the robot system to generate a loud alarm signal and to generate a signal for auto-dialing a central monitor unit, and a third function push-switch which commands said robot system to produce a beeping signal to indicate a position of the robot system.

* * * * *